United States Patent [19]

Bratten et al.

[11] 4,179,364
[45] Dec. 18, 1979

[54] DIFFUSION DEVICE FOR BLOOD

[75] Inventors: William R. Bratten, Antioch; Joel N. Helfer, Buffalo Grove, both of Ill.

[73] Assignee: Baxter Travenol Laboratories, Inc., Deerfield, Ill.

[21] Appl. No.: 903,314

[22] Filed: May 5, 1978

[51] Int. Cl.$^2$ ............................................. B01D 31/00
[52] U.S. Cl. ................................. 210/321 B; 422/48; 210/450; 210/493 M; 264/258
[58] Field of Search ............... 210/321 B, 22, 493 M, 210/450; 23/258 M; 264/258, 286, 339, 345

[56] References Cited

U.S. PATENT DOCUMENTS

| 3,370,710 | 2/1968 | Bluemle, Jr. | 210/321 B |
| 3,862,031 | 1/1975 | Leonard | 210/321 B |
| 4,028,252 | 6/1977 | Morris | 210/321 B |

OTHER PUBLICATIONS

Leonard, et al., "A New Tidal-Flow Dialyzer: In Vivo, In Vitro, and Mathematical Assessment," from vol. XIII, Trans. Amer., Soc. Artif. Int. Organs, 1967, pp. 208-214.

Primary Examiner—Frank A. Spear, Jr.
Attorney, Agent, or Firm—Paul C. Flattery; Garrettson Ellis

[57] ABSTRACT

In a convoluted-membrane type diffusion device for blood, such as a blood oxygenator, in which the membrane is supported by a stiff, folded, integral backing having port means for fluid flow therethrough. The backing is provided with laterally positioned tabs on each edge thereof, the tabs being folded inwardly against inner portions of the backing and sealed thereto. This provides double thickness edge portions of the backing to provide spacing and a gasket seal at opposed edges of the stack of convoluted membrane layers. The backing may be coated with thermoplastic material, which may be used as an adhesive to hold the tabs in folded double thickness relation with the rest of the backing.

8 Claims, 6 Drawing Figures

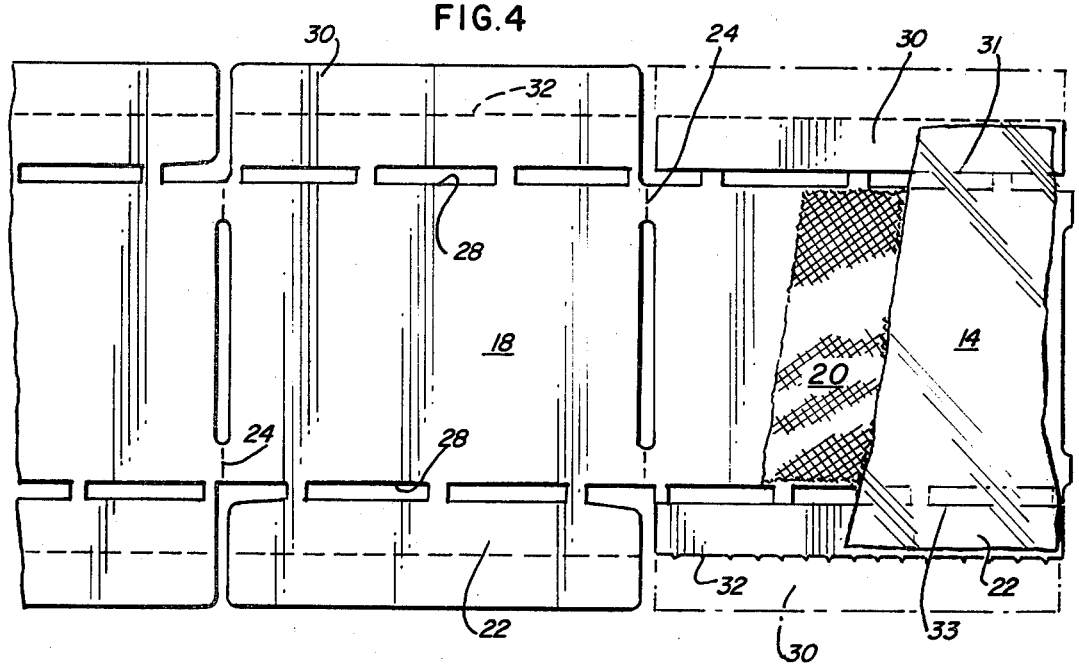
FIG. 4
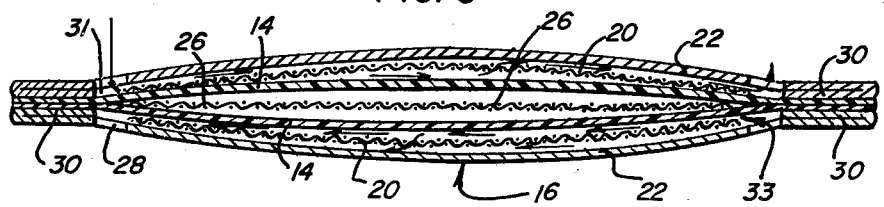
FIG. 3
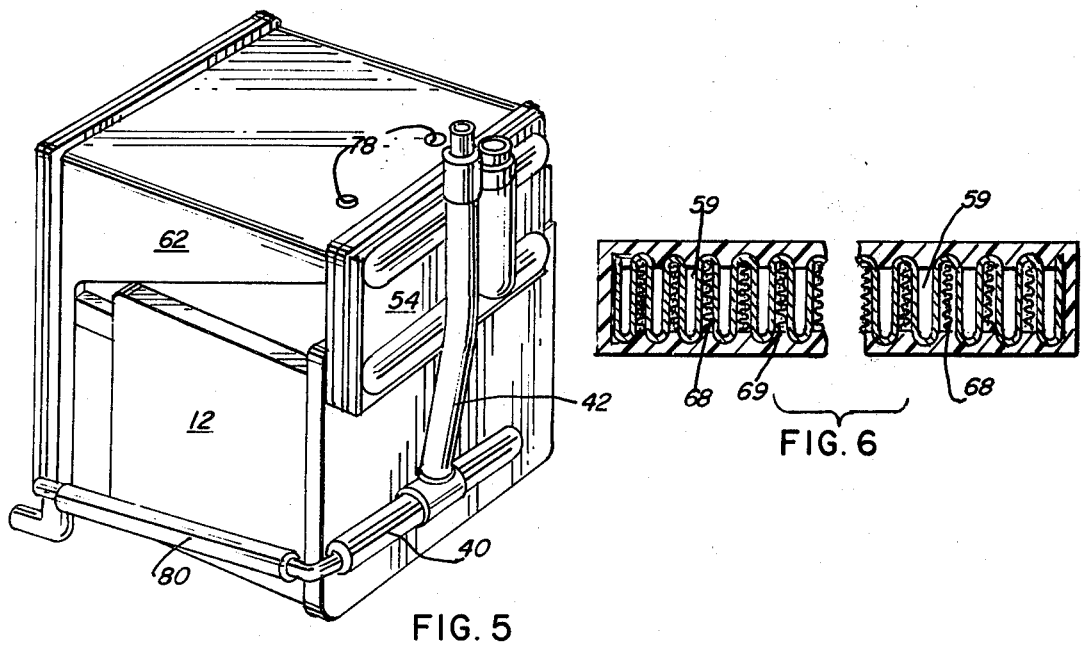
FIG. 5
FIG. 6

DIFFUSION DEVICE FOR BLOOD

BACKGROUND OF THE INVENTION

Membrane oxygenators are currently in use in heart-lung machines for maintaining the respiration and blood flow of the patient during open heart surgery and the like.

In U.S. Pat. Nos. 3,757,955 and 3,879,293, for example, convoluted membrane type oxygenators are disclosed which are supported by a stiff, integral backing having transversely extending, generally parallel score lines, and folded on the score lines into sections and arranged on one side of the membrane. This arrangement has provided a major advance in the quality of oxygenation provided to patients, as well as a major advance in the simplicity of assembly of a multiple membrane layer-type oxygenator for blood.

The invention of this application represents a further improvement in the assembly of convoluted membrane type oxygenators, in which an integral spacing member is formed at the respective opposed ends of the flow paths through the convoluted membrane pockets, eliminating the need for a taped seal, or other relatively complex techniques for sealing the ends of the convoluted membrane stack which is formed in accordance with the teachings of the previously cited patents.

As a result, the folded membrane stack may be more effeciently assembled, with equal or improved reliability of sealing at the ends, due to the integral spacing members formed in accordance with this invention.

DESCRIPTION OF THE INVENTION

This application relates to a diffusion device for blood having, as a diffusion means, a flexible, semipermeable membrane folded into a stack to provide a plurality of membrane layers arranged for flow of blood in a plurality of parallel first flow paths, and for flow of another fluid in a plurality of parallel second flow paths, positioned between in interleaving relation and separated from said first flow paths by said membrane. A stiff, integral backing is provided having transversely extending, generally parallel score lines, and folded on said score lines into sections, and arranged on one side of the membrane in the second flow path for support of the membrane layers. The backing also defines spaced port means to permit fluid flow therethrough.

In accordance with this invention, laterally positioned tabs are provided on each edge of the stiff backing, the tabs being folded inwardly against other portions of the backing and sealed thereto. The effect of this is to provide double thickness edge portions of the backing, to provide a spacing and gasket seal at opposed edges of the folded stack.

Preferably, the stiff, integral backing may be coated with a thin film of thermoplastic material such as polyethylene. At a suitable time in the folding process, the thermoplastic coating on the tabs is heated, for example with hot air, to soften the thermoplastic coating on the tabs adjacent the edge of the backing. The folded tabs may then be pressed into the other portions of the backing so that the thermoplastic coating causes the tabs to adhere in face-to-face relationship with the remainder of the backing.

Accordingly, when the backing is then folded along the transversely extending score lines to form the above described stack of membrane layers with the interleaving backing sections, the double thickness edges of the backing provide a spacing and gasket seal means along the edges thereof.

Preferably prior to folding of the backing, it is overlaid with spacer means in a position between the spaced port means. Then the backing and spacer means is further overlaid with diffusion membrane means of a width and orientation to overlie the spacer means and the port means. Thereafter, the backing, spacer means, and membrane may be convoluted as described into folded sections by folding along the score lines to form a diffusion membrane stack having interleaving sections of the backing and membrane pockets, with the folded tabs acting as a gasket member of increased thickness, compared with the rest of the stack, so that placement of the stack in a tight casing provides sealing to opposed edges of the stack.

In the drawings,

FIG. 3 is a longitudinal sectional view of a flow envelope, showing part of the oxygen and blood flow path within the membrane diffusion device utilized in the embodiment of FIG. 1.

FIG. 4 is a plan view of the membrane backing and related parts used to help define the plurality of flow envelopes found in the device of FIG. 1.

FIG. 5 is a perspective view of the diffusion system of FIG. 1.

FIG. 6 is a sectional view taken along line 6—6 of FIG. 2.

Figure 2:
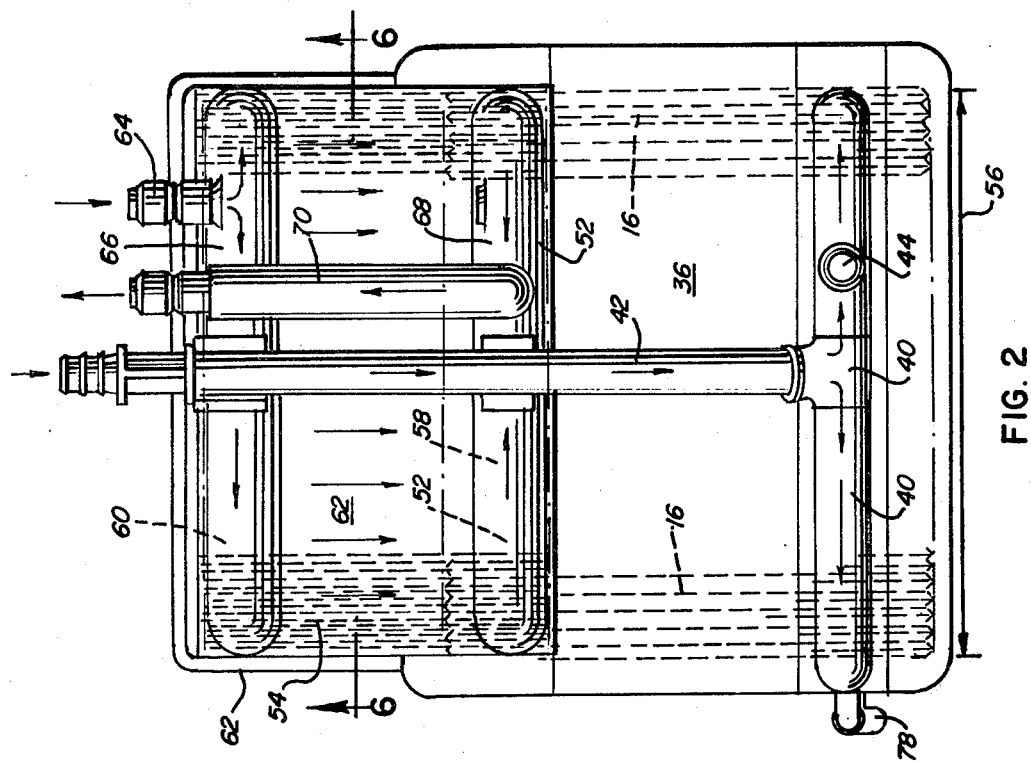
FIG. 2 is an elevational view of the system of FIG. 1, rotated 90 degrees about its vertical axis.

Referring to the drawings, diffusion system 10 comprises a membrane diffusion device 12, which may be generally made in accordance with the disclosures of U.S. Pat. Nos. 3,879,293 and 3,757,955.

The membrane diffusion device or oxygenator 12 preferably comprises a porous, hydrophobic membrane such as polypropylene having minute pores in the submicron range, which permits gas to easily pass through the membrane, while the liquid blood cannot. Porous, hydrophobic membrane 14 is assembled into a large plurality of (preferably about 75) separate flow envelopes 16 by being overlaid on flat backing 18, as taught in the patents cited above, which may be preferably made of cardboard treated with polyethylene, or a similar thermoplastic.

In this specific embodiment, a strip of screening 20 is laid over cardboard backing 18, after which membrane 14 is laid on the backing, and the cardboard backing is folded into a series of panels 22 along fold lines 24 into a series of convolutions, as taught in the previously-cited patents, to define the connected individual envelopes or pockets 16. The blood flow path then runs between sections 14 of the membrane within each envelope 16, passing from edge 31 to edge 33 of the envelope, while the oxygen flow path is positioned between backing sections 22 and a membrane section 14, percolating through screen 20.

Added screening 26 may be placed in the blood flow path of each connected envelope 16.

The backing 18 includes longitudinally extending cutaway portions 28, in which the portions of adjacent panels 22 can interact together, as illustrated in FIGS. 20 to 22 of U.S. Pat. No. 3,757,955, forming continuous manifold flow passages to facilitate the flow of oxygen gas and blood into and out of each envelope.

Extra tabs 30 are provided at each edge of backing 18, to be folded inwardly along the fold lines 32, to provide spacer gaskets, at the ends of each envelope. The paperboard of backing 18, may be coated with a relatively low melting polyethylene material or the like so that tabs 30 may be heat sealed into folded position by melting the polyethylene and thus sealing tabs 30 into their folded position. Then, the side edges of backing 18 may be covered with double faced adhesive tape. The relatively narrow screen 26 is laid between the taped edges. Thereafter, membrane 14 is laid on with edges adhering to the tape. The assembly is then convoluted into an accordian fold along fold lines 24, and screens 26 may be added to the connected envelopes 16 thus formed. As the assembly is folded, beads of RTV sealant may be added along the membrane edges for improved sealing.

The heat sealing step may take place simply by blowing hot air at tabs 30 and the edges of backing 18, to melt the polyethylene coating. The folded over paperboard backing 18 may pass through the hot air jet, after which the folded tabs 30 are pressed down into the remainder of backing 18 and allowed to adhere together as the polyethylene cools.

The above technique eliminates the need for the use of tape to provide end spacers and seals of the envelopes that are formed, and replace that generally manual process with a process which is capable of full automation.

Alternatively, the hot air blast could be replaced by a spray adhesive, if desired, to adhere tabs 30 to the body of the backing 18 by a different technique.

Additionally, the hot air blast could be used to adhere screens 26 to the paperboard by softening polyethylene in the central portion of the paperboard or by softening the screens, if desired.

As shown in FIG. 4, it is preferable for screen 26 to be proportioned so that it is positioned between the respective, spaced, longitudinally extending cutaway portions adjacent opposite edges of backing 18. This prevents obstruction of the apertures 28 by the screen 26. Similarly, tabs 30 are preferably proportioned so they do not overlie cutaway portions 28 either. Conversely, membrane 14, which is laid down after screen 26 on the backing, is preferably proportioned to approximate the width of the backing 18 after tabs 30 have been folded inwardly, as shown in FIG. 4, to facilitate the sealing of the edges of membrane 14.

The assembly of the semi-permeable membrane and backing stacks of this invention, defining individual envelopes 15, may be a continuous, automated process, with rolls of backing 18, screening 26, and membrane 14 being used, and conventional nip rollers and the like being provided to control the forward progress of the assembly.

The integral stack of connected envelopes 16 are placed in canister 34, closed by a cover 36, generally in accordance with U.S. Pat. No. 3,879,293, proportioned to tightly squeeze the overlying tabs 30 in the stack for sealing the ends thereof.

Gas inlet 35 is adapted for connection with an oxygen gas source, for leading gas through a gas inlet aperture 37 to permit a flow of gas through the stack of envelopes. Gas outlet 38 receives the exhaust gas from the gas exhaust aperture 39 of the device, to convey it away from the apparatus.

Blood inlet 40 is also a wide aperture, as shown in FIG. 2, receiving blood from vertically extending line 42, having means for attachment to a flexible conduit for receiving venous blood from the patient. Connection 44 is also provided for communicating with blood inlet 40. Connection 44 may be connected with a cardiotomy sucker for the operation.

The purpose of vertically extending conduit 42 is to provide a pressure head of the blood in conduit 42 a predetermined blood pressure at all times within the oxygenator 12, whenever line 42 is filled with blood.

The blood enters the oxygenator, passing through wide inlet aperture 40 which, as shown in FIG. 2, extends essentially the entire width of the oxygenator. The blood then proceeds in the direction of arrows 46 into connected envelopes 16, then passing in a wide front in the direction of arrows 48 through the length of the envelopes. For withdrawal of the blood at the other ends of envelopes 16 the blood moves outwardly of the envelopes in the direction of arrows 50, being withdrawn through wide blood outlet 52, which communicates directly with the wide blood inlet 58 of heat exchanger 54.

The blood flow path through heat exchanger 54 is of equal width to the flow path in oxygenator 12, in the direction which is perpendicular to directions 48, 50 and 54 of blood flow, as shown in FIG. 2. This is equal to width of the corresponding blood flow path through envelopes 16, outlet slot 52 of the oxygenator, and inlet slot 58 of the heat exchanger.

Heat exchanger 54 may be of a design similar to the convoluted wall heat exchanger disclosed in U.S. Pat. No. 3,640,340, but the heat exchanger used herein preferably contains about 58 pockets or blood passages 59 in the convoluted wall for the flow of blood, and is thus of considerably increased width and decreased flow resistance from the embodiment shown in the previously described patent. The blood passages 59 through heat exchanger 54 are preferably free of flow distribution screening, or other means for increasing the flow resistance to provide a more even flow in the various flow passages to the heat exchanger. This is possible because the wide connection of the blood exit 52 in the oxygenator 12 and the blood inlet 58 of heat exchanger 54 greatly reduces non-uniformity of flow in the flow passages 59, rendering such screening unnecessary.

The blood passages 59 may, for example, be 1/16 inch thick, $\frac{1}{2}$ inch deep, and 4.25 inches long in the heat exchanger.

Blood flows from the flow passages 59 in the heat exchanger 54 through an outlet slot 60, once again which is of essentially width 56, into rigid reservoir 62, which may be made of a transparent, plastic material, so that the blood flow is in the form of a wide, generally flat ribbon as it flows through reservoir 62.

Heat exchange solution may be pumped into heat exchanger 54 through inlet 64, passing by means of manifold 66 into the opposed set of pockets 68 defined by the heat exchange wall in interleaving, heat exhange relationship with the plurality of blood flow paths. Screens 69 may be used here if desired. In this embodiment, manifold 66 is also shown to be of the same width 56 as the blood flow path.

The spent heat exchange solution passes from heat exchanger 54 into manifold 68, which is also of width 56, and is collected in line 70 which, in turn, may be connected to a receiving line to convey the spent heat exchange solution back to a suitable temperature control device for heating or cooling the fluid for another pumped pass through the heat exchanger 54, if desired.

Reservoir 62 defines a downwardly sloping floor 72 which receives the wide ribbon of oxygenated and temperature-controlled blood pouring from the outlet of the heat exchanger 54. The blood within reservoir 62 flows in its narrow ribbon through outlet 60 for the heat exchanger, through the inlet 61 of the reservoir, of equal width to outlet 60, onto sloping floor 72. This causes the blood to flow in a narrow ribbon until it reaches the pool of blood 74 which resides in vertical tubular leg 76 of the reservoir.

The outlet 78 to the reservoir is positioned at the bottom of vertical tubular leg, and may be connected to an arterial line for reconveying the blood back to the patient.

Accordingly, as the blood passes down sloping floor 72 in a thin ribbon, abundant opportunity is provided for the removal of microbubbles from the blood, prior to the blood reaching the relatively quiescent pool 74, where also bubbles may be removed.

It is preferable for the inflow and outflow rate of the blood through the diffusion system of this invention to be adjusted so that as the level of pool of blood 74 slightly overflows vertical leg 76, as shown, to give the blood a long flow path across floor 72, and to join with pool 74 without bubbles creating excessive turbulence.

Preferably, the maximum depth 63 of reservoir 62 at positions spaced from channel portion 76 is no more than one half of width 56.

Gas bubbles may be vented through vents 78 in the upper wall of reservoir 62. Vents 78 may be closed with a microporous, hydrophobic material having an effective pore size of no more than about 30 microns, for example polypropylene paper or the like. Accordingly, gases can be vented from reservoir 62, while contaminants from the exterior are prevented from entry into the reservoir through vent ports 78.

Shunt line 80 is provided, and may preferably comprise a flexible tube connected at the respective ends with rigid connector members 82, 84 which, in turn respectively connect with blood inlet 40 for the oxygenator and the bottom of vertical, tubular leg 76 of reservoir 62. Shunt line 80 is normally clamped with a hemostat or other clamp member. However, when the oxygenation process is completed, it may be opened to facilitate the complete drainage of blood from the diffusion system through outlet 78.

Figure 1:
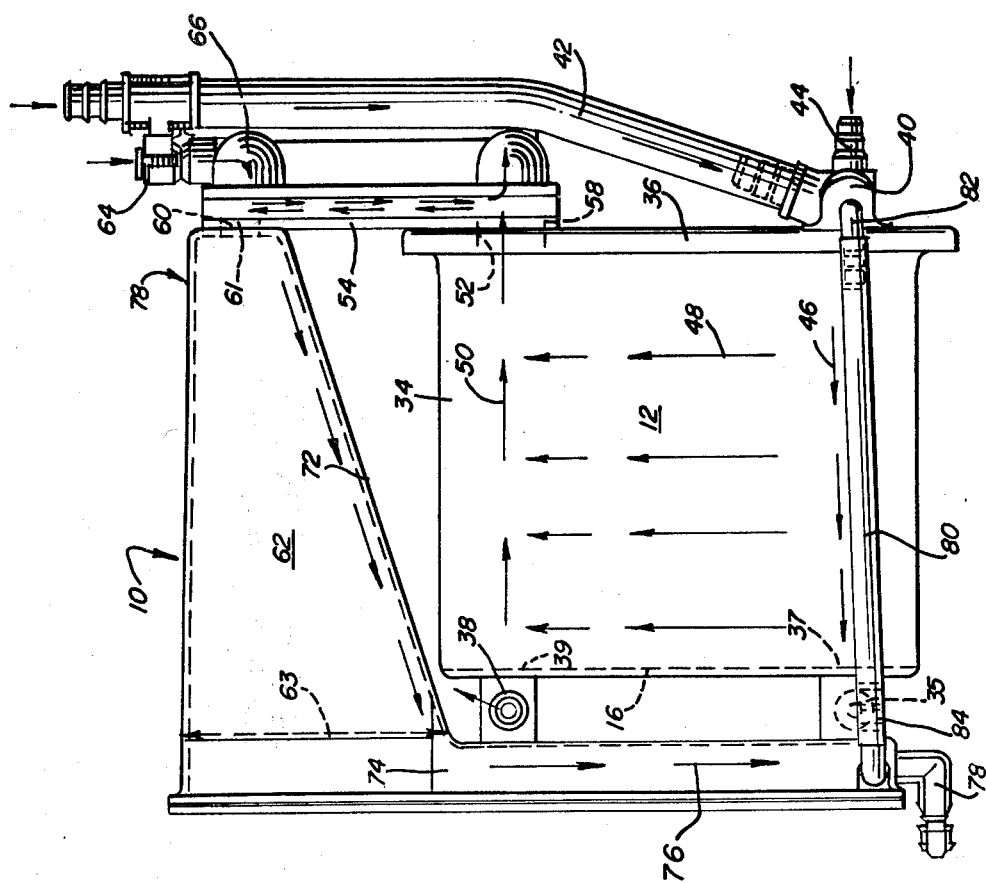
FIG. 1 is an elevational view of a diffusion system in accordance with this invention for the oxygenation of blood.

Oxygenator 12 may conveniently be fabricated so that the blood flow paths of envelopes 16 are about 4.25 inches long and 0.025 inch thick (as seen in FIG. 2), and 6 inches deep (as shown by FIG. 1), to provide the desired membrane surface area to accommodate the respiratory needs of an adult patient.

Width 56 may be 7.5 inches, to provide a system of extremely low pressure drop, even flow, and highly effective oxygenation and temperature control capabilities. Reservoir 62 may also be 7.5 inches wide to accommodate the ribbon stream of blood without creation of turbulence, for removing of gas bubbles along sloping floor 72.

The above has been offered for illustrative purposes only, and is not for the purpose of limiting the invention of this application, which is as defined in the claims below.

That which is claimed is:

1. In a diffusion device for blood having as a diffusion means a flexible, semi-permeable membrane folded into a stack to provide a plurality of membrane layers arranged for flow of blood in a plurality of parallel first flow paths and for flow of another fluid in a plurality of parallel second flow paths positioned between and separated from said first flow paths by said membrane, and a stiff, integral backing having transversely extending, generally parallel score lines and folded on said score lines into sections and arranged on one side of said membrane in said second flow paths for support of said layers and spaced port means defined in said backing to permit fluid flow therethrough, the improvement comprising: laterally positioned tabs on each edge of the stiff backing, said tabs being folded inwardly against inner portions of said backing and sealed thereto to provide double thickness edge portions of said backing, to provide a spacing and gasket seal at opposed edges of said stack.

2. The diffusion device of claim 1 in which spacer means is positioned between said backing and membrane for facilitating fluid flow therebetween.

3. The diffusion device of claim 2 in which said spacer means overlies said stiff, integral backing in a position between said port means, and said stiff, integral backing and spacer means is further overlaid with said semi-permeable membrane, which is of a width and orientation to overlie said spacer means and said port means.

4. The diffusion device of claim 3 in which said folded, stiff, integral backing spacer means and semi-permeable membrane is positioned in a tight-fitting casing, whereby the spacing and gasket seal defined by the folded tabs is subjected to increased compression relative to the remainder of said folded stack.

5. The diffusion device for blood of claim 1 in which said tabs are proportioned so as not to overlie said port means.

6. The method of processing a stiff, integral backing coated with thermoplastic material and having transversely extending, generally parallel score lines, and spaced port means for facilitating the flow of fluid through the diffusion system in use, after folding into a convoluted arrangement with a flexible, semi-permeable membrane, which method comprises: folding the edges of said stiff backing inwardly to define overlying tabs on the edges of said backing in overlying, double thickness relation with said backing, heat-softening the thermoplastic coating on said tabs adjacent the edge of said backing, and pressing said folded tabs into the remainder of said backing, whereby the thermoplastic coating causes said tabs to adhere in face-to-face relationship with the remainder of said backing, to provide spacing gasket means along the edges of said backing.

7. The method of claim 6 in which said backing is thereafter overlaid with spacer means in a position between said spaced port means, and then said backing and spacer means is further overlaid with diffusion membrane means of a width and orientation to overlie said spacer means and said port means, and thereafter said backing spacer means and membrane are convoluted into folded sections by folding along said generally parallel score lines to form a diffusion device stack of said folded sections, said tabs serving as a gasket member of increased thickness, compared with the rest of said stack, whereby implacement of said stack in a tight casing provides sealing to opposed edges of said stack.

8. The method of claim 7 in which said tabs are proportioned so as to not overlie said port means.

* * * * *